US012552637B2

(12) United States Patent
Mason

(10) Patent No.: US 12,552,637 B2
(45) Date of Patent: Feb. 17, 2026

(54) METHOD AND MONITORING DEVICE FOR INFERRING A HEALTH STATUS OF CALL DEVICES IN AN ELEVATOR ARRANGEMENT

(71) Applicant: Inventio AG, Hergiswil (CH)

(72) Inventor: Christopher Mason, Ledgewood, NJ (US)

(73) Assignee: INVENTIO AG, Hergiswil (CH)

( * ) Notice: Subject to any disclaimer, the term of this patent is extended or adjusted under 35 U.S.C. 154(b) by 1359 days.

(21) Appl. No.: 17/250,913

(22) PCT Filed: Sep. 12, 2019

(86) PCT No.: PCT/EP2019/074399
§ 371 (c)(1),
(2) Date: Mar. 26, 2021

(87) PCT Pub. No.: WO2020/064359
PCT Pub. Date: Apr. 2, 2020

(65) Prior Publication Data

US 2021/0339980 A1 Nov. 4, 2021

(30) Foreign Application Priority Data

Sep. 28, 2018 (EP) .................................... 18197402

(51) Int. Cl.
*B66B 5/00* (2006.01)
*B66B 1/46* (2006.01)

(52) U.S. Cl.
CPC ............ *B66B 5/0025* (2013.01); *B66B 1/468* (2013.01); *B66B 5/0012* (2013.01)

(58) Field of Classification Search
CPC ...... B66B 5/0025; B66B 1/468; B66B 5/0012
USPC .......................................................... 187/391
See application file for complete search history.

(56) References Cited

U.S. PATENT DOCUMENTS 4,698,780 A 10/1987 Mandel et al.
6,550,586 B1 4/2003 Takeuchi

FOREIGN PATENT DOCUMENTS

CN 101602466 A 12/2009
CN 108545562 A 9/2018
CN 117105027 A * 11/2023 ........... B66B 1/2408
CN 117262933 A * 12/2023
CN 117303142 A * 12/2023 ............ B25J 11/008
(Continued)

*Primary Examiner* — Kawing Chan
(74) *Attorney, Agent, or Firm* — Shumaker, Loop & Kendrick, LLP

(57) ABSTRACT

A method for inferring a health status of call devices in an elevator arrangement uses a monitoring device for implementing the method steps of: determining elevator usage information by detecting: changing of an opening status of an elevator door, interrupting of a light curtain at an entry to an elevator car, and/or changing of a weight of the elevator car; determining elevator travel information concerning a starting floor and/or a target floor for an elevator car motion taking place antecedent or subsequent to the detected elevator event; inferring the health status of a monitored one of the call devices based on the elevator usage information and on the elevator travel information. The method allows determining the health status of call devices such as car call devices and hall call devices with a reduced number of sensors.

16 Claims, 1 Drawing Sheet

(56) References Cited

FOREIGN PATENT DOCUMENTS

| | | | |
|---|---|---|---|
| EP | 1308410 | A1 | 5/2003 |
| EP | 2361868 | A1 | 8/2011 |
| JP | H10194617 | A | 7/1998 |
| WO | 2007132499 | A1 | 11/2007 |
| WO | 2010067439 | A1 | 6/2010 |

* cited by examiner

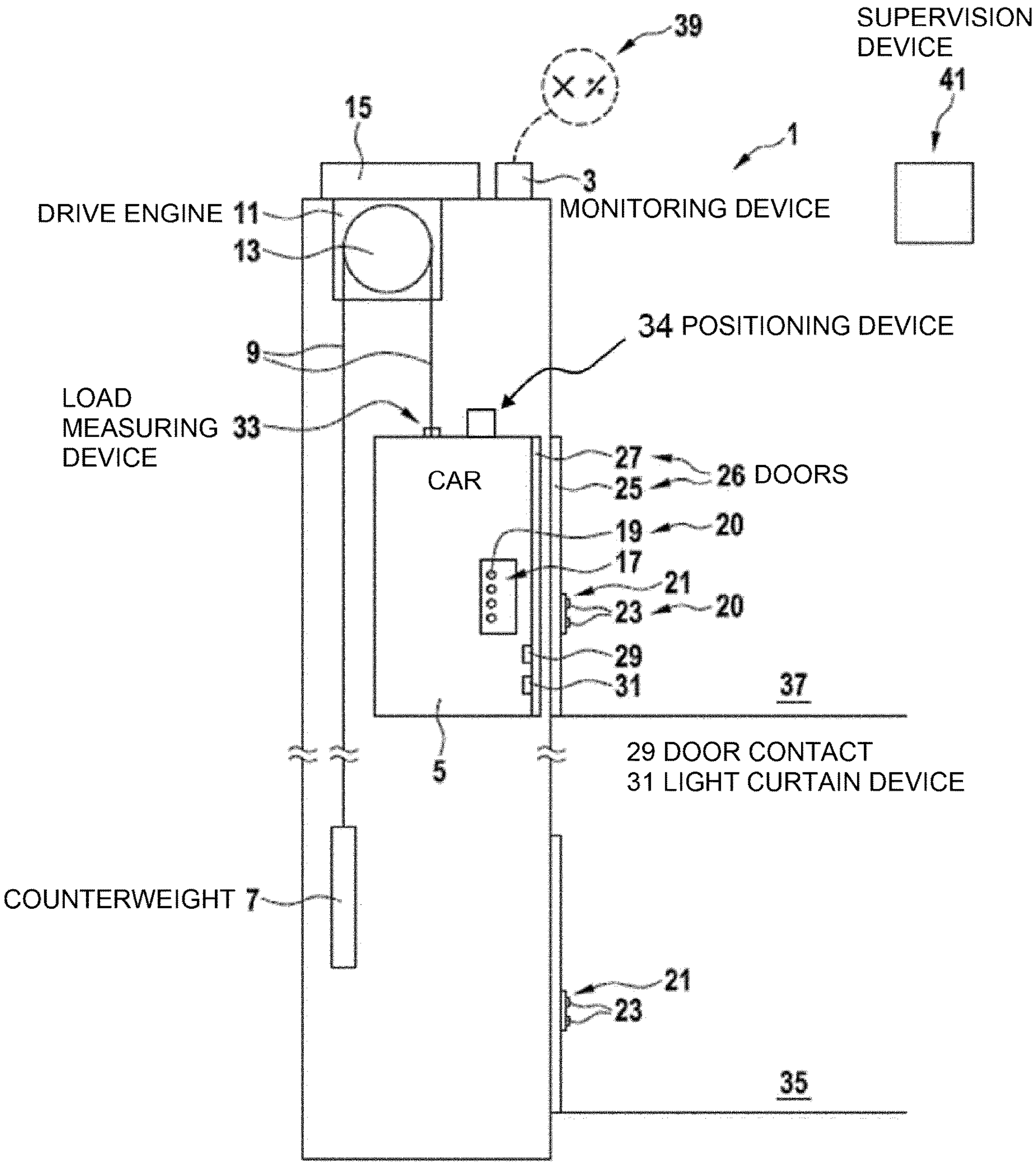
39
SUPERVISION DEVICE
41
15
1
3
MONITORING DEVICE
DRIVE ENGINE 11
13
34 POSITIONING DEVICE
9
LOAD MEASURING DEVICE 33
CAR
27
25
26 DOORS
19
20
17
21
23
20
29
31
37
5
29 DOOR CONTACT
31 LIGHT CURTAIN DEVICE
COUNTERWEIGHT 7
21
23
35

METHOD AND MONITORING DEVICE FOR INFERRING A HEALTH STATUS OF CALL DEVICES IN AN ELEVATOR ARRANGEMENT

FIELD

The present invention relates to a method and a monitoring device for inferring a health status of call devices in an elevator arrangement.

BACKGROUND

Elevators generally serve in buildings for transporting passengers in an elevator car vertically between various floors. Therein, a displacement of the elevator car is controlled in reaction to elevator calls submitted by the passengers using call devices. Generally, such call device is adapted for being activated by a passenger and then submitting a signal to an elevator controller for indicating that the passenger wants to use the elevator car for being transported to another floor.

For example, such call device may be installed within the elevator car such that the passenger, after having entered the elevator car, may use the call device for indicating a target floor to which the elevator car shall travel. Such car-based call device is sometimes referred to as car call device and may be part for example of a car operation panel (COP).

Furthermore, call devices may be installed in halls at floors to be served by the elevator. Accordingly, a passenger waiting at a floor may activate the call device in this floor for indicating that the elevator car shall travel to his waiting floor. Such hall-based call device provided at a landing floor is sometimes referred to as hall call device and may be part for example of a landing operation panel (LOP).

Generally, call devices may be conventional call buttons which may be activated by physically touching or pressing an activation button. The activation button may be part of a switch or push button which, upon being touched or pressed, changes its switching state and sends for example a call signal to the elevator controller. However, call devices may also be implemented in other technical ways. For example, a call device may apply various technologies such as visual monitoring using for example a camera, electromagnetic monitoring using for example an NFC (near field communication) device, acoustic monitoring using for example a microphone, or many more technologies.

Typically, a plurality of call devices is comprised in an elevator arrangement. For example, one call device is comprised in the elevator car and at least one call device is provided at each of the floors served by the elevator arrangement. All call devices may communicate with the elevator controller such as to submit their calls. Accordingly, the elevator controller may control and coordinate motions of the elevator car in reaction to received calls.

The operation of elevators should be reliable. Therefore, any malfunction in the elevator and its components should be detected as early as possible. This is particularly true concerning malfunctions in call devices. Therein, occurrence of any malfunctions is said to affect a so-called health status of an elevator component, i.e. the health status indicates whether or not the elevator component is operating regularly or is in an irregular operation state.

Conventionally, malfunctions in an elevator may have to be reported by passengers upon trying to use the elevator or may have to be detected by a technician upon servicing the elevator, before then enabling repair of the malfunction. However, in such approach, malfunctions are generally detected and repaired only after discomfort for the passenger has been provoked or substantial efforts had to be provided by the technician.

In order to detect malfunctions already at an earlier stage and/or with less efforts, automatically monitoring of any malfunctions of elevator components has been established in modern elevators. For example, elevator components are provided with sensors sensing characteristics of their health status relating to a correct functioning or to any malfunctions. However, in such approach, a multiplicity of sensors may have to be provided and/or communication between such sensors and a monitoring unit has to be established in order to enable monitoring various elevator components. Accordingly, substantial hardware has to be provided and has to be installed in the elevator arrangement.

Furthermore, in already existing elevators or upon retrofitting elevators of other elevator manufacturers, it may be difficult to include additional sensors for monitoring already existing elevator components. Particularly, it may be difficult to include or retroactively add sensors in call devices of an elevator in order to enable monitoring correct functioning of such call devices and detect any malfunctions in such call devices. Additionally, it may be difficult to gain access to an elevator controller in already existing elevator arrangements, particularly in those originally installed by another manufacturer, such that getting access to any data exchange between the elevator controller and sensors included in the elevator arrangement may be difficult or even impossible upon modernizing such elevator arrangements.

There may be a need for a method for inferring a health status of call devices in an elevator arrangement, such method enabling detecting any malfunctions in the call devices with reduced work efforts and/or with reduced hardware requirements. Particularly, there may be a need for a method providing information regarding the health status of call devices without necessarily requiring adding sensors and/or circuitries to the call devices. Furthermore, there may be a need for a monitoring device and/or a computer program product for implementing such method and for a computer readable medium having such computer program product stored thereon.

SUMMARY

Such needs may be met with the subject-matter of the advantageous embodiments defined in the following specification.

According to a first aspect of the present invention, a method for inferring a health status of call devices in an elevator arrangement is proposed. The method comprises at least the following steps, possibly but not necessarily in the indicated order: Elevator usage information is determined by detecting elevator events such as changing an opening status of an elevator door, interrupting of a light curtain to an elevator car, and/or changing of a weight of the elevator car. Furthermore, elevator travel information is determined, the elevator travel information concerning a starting floor and/or a target floor for an elevator car motion taking place antecedent to the detected elevator event or subsequent to the detected elevator event. Then, the health status of a monitored call device out of the multiplicity of call devices is inferred based on the elevator usage information and on the elevator travel information.

According to a second aspect of the invention, a monitoring device for inferring a health status of call devices in an elevator arrangement is proposed. The monitoring device is configured for performing or controlling a method according to a first aspect of the invention.

Particularly, according to an embodiment, the monitoring device comprises or is connected to a door contact for detecting a change in an opening status of an elevator door, to a light curtain device for detecting interrupting of a light curtain to an elevator car, and/or to a load measuring device for detecting changing of a weight of the elevator car.

According to a third aspect of the invention, a computer program product is proposed, the computer program product comprising computer readable instructions which, when performed by a processor of a monitoring device, instruct the monitoring device to perform or control the method according to an embodiment of the first aspect of the invention.

According to a fourth aspect of the invention, a computer readable medium is proposed, the computer readable medium comprising a computer program product according to the third aspect of the invention stored thereon.

Ideas underlying embodiments of the present invention may be interpreted as being based, inter alia, on the following observations and recognitions.

As briefly indicated in the introductory portion, monitoring a health status of call devices may require complex and/or expensive efforts, particularly in elevator arrangements which were originally installed by other manufacturers such that no detailed knowledge about their elevator components is available. Particularly, remote monitoring devices to be employed for third-party equipment may be expensive to add and may usually provide only limited access to information about a state of health of the equipment as a direct integration e.g. with the controller software may not be possible. Furthermore, any information which can be garnered must typically be acquired by sensors which require labor and material. Additionally, monitoring an operational health of hall call devices and car call devices may require significant wiring and/or specialized interfaces which may not impact an operation of the call button.

The method proposed herein allows to obtain information about the health status of call devices in an elevator arrangement without necessarily requiring additional hardware and/or wiring.

Instead, it is proposed to track an occurrence of specific elevator events and motions of the elevator car and to then use the tracked information in order to infer information about the health status of monitored call devices therefrom.

Specifically, different types of elevator events may be tracked, i.e. their occurrence may be detected, and so-called elevator usage information may be derived therefrom.

For example, as a first type of elevator event, an opening status of an elevator door may be monitored and opening or closing of the elevator door may be detected. Therein, the elevator door may be a car door or a floor door. Generally, an elevator door is opened in order to let a passenger enter or leave the elevator car. Typically, the opening status of an elevator door may be detected using one or more door contacts. Such door contacts change their switching state depending on the opening status of the elevator door. For example, a door contact may be configured and arranged such that it is closed only upon the elevator door being completely closed. For example, door contacts may be included in a safety chain of the elevator arrangement such that the elevator controller may determine by monitoring a status of the safety chain whether or not all elevator doors are correctly closed before enabling any displacement of the elevator car. Conventionally, door contacts may be simple mechanical switches. However, in modern elevator arrangements, door contacts may be electronic switches allowing for both, high reliability and low maintenance requirements. As door contacts are generally a safety feature, they are generally also included in already existing elevator arrangements. Furthermore, door contacts and/or their signals to an elevator controller may be easily accessible also in existing elevator arrangements.

As a second exemplary type of elevator event, interrupting of a light curtain at an entry to the elevator car may be detected. Generally, regulations may rule that any closing of an elevator door has to be prevented as long as a passenger stands within a motion path of the elevator door. Therefore, a light curtain comprising one or more light barriers is typically provided at an entrance to the elevator car. The light curtain is generated by a light curtain device which monitors temporary interruption of the light barriers. For example, a light beam may be emitted by a light source arranged at one side of the elevator door opening and a light detector arranged at the opposite side of the elevator door opening may receive such light beam. As long as the passenger is located within such light barrier and therefore interrupts the light barrier, the light curtain device may detect the interruption of the light beam and may therefore conclude that a passenger is currently entering or leaving the elevator car through the elevator door opening. Accordingly, any elevator door motion may be temporarily blocked. As light curtains are safety features, they are generally comprised in elevator arrangements and the light curtain device and/or its signals to an elevator controller may be easily accessible also in existing elevator arrangements.

As a third exemplary type of elevator event, changing of the weight of the elevator car may be detected. Generally, a current weight of the elevator car may have to be determined in order to enable detecting any overload condition. Accordingly, a load measuring device may be comprised in the elevator arrangement for measuring a weight of the elevator car or at least for detecting changes in such weight. Such load measuring device may comprise for example a force sensor or a pressure sensor. The load measuring device may be arranged for example between the elevator car and a suspension means carrying the elevator car and may therefore measure forces applied to the suspension means due to the weight of the elevator car. Alternatively, the load measuring device may be installed at a bottom of the elevator car for measuring a pressure acting onto this bottom. Again, as the option for measuring a weight of the elevator car or at least measuring changes of such weight is a safety feature, a load measuring device is generally comprised in an elevator arrangement and the load measuring device and/or signals to an elevator controller may be easily accessible also in existing elevator arrangements.

It is helpful to determine the elevator usage information by detecting a current position of the elevator car, as the current position of the elevator car, i.e. at which floor the car is currently staying, stopped or passing, is vital to processing the aforementioned elevator usage information and other sensor information.

The elevator usage information determined upon detecting the at least one elevator event may inform about a current usage of the elevator. Particularly, the detected elevator events may allow deriving information about whether or not a passenger is currently entering and/or is currently leaving the elevator car. Generally, any usage of an elevator by a passenger is preceded by the passenger having actuated one of the elevator's call devices. As explained further below with reference to some exemplary embodiments, such elevator usage information may then be used upon inferring the health status of call devices.

It shall be noted that the elevator usage information may not only be valuable when indicating that one of the elevator events was detected but may also be valuable when indicating that, currently, no such elevator event was detected. In other words, it may be a valuable information for inferring a health status of the call device when the elevator usage information indicates that for example no opening of the elevator door has been detected and/or no interruption of the elevator light curtain has been detected and/or no change in a weight of the elevator car has been detected.

Additional to the elevator usage information, so-called elevator travel information is determined. Such elevator travel information informs about a location of the elevator car just before or after the above-mentioned elevator event is detected. In other words, the elevator travel information may for example indicate a starting floor at which the elevator car is waiting before a passenger enters the elevator car and/or before the elevator car is starting a trip towards another floor. Alternatively or additionally, the elevator travel information may for example indicate a target floor to which the elevator car has been moved before a passenger enters or leaves the elevator car.

The elevator travel information indicating a current location of the elevator car at points in time before or after an occurrence of an elevator event may be obtained for example from the elevator controller unit. Generally, the elevator controller unit knows where the elevator car is currently located. Alternatively, a current location of the elevator car may be easily tracked using other technical means. For example, an acceleration sensor may be provided at the elevator car. Based on knowledge about an initial position, the current position of the elevator car may then be derived taking into account acceleration signals from such sensor. As a further alternative, data from a global positioning system (GPS) or a local positioning system may be used for determining the elevator car's current position.

Taking into account both, the determined elevator usage information as well as the determined elevator travel information, information about the health status of a monitored one of the call devices in an elevator arrangement may be inferred. Therein, it may be used that, on the one hand, knowing whether or not a passenger has entered or left the elevator car based on the elevator usage information and, on the other hand, knowing from which starting floor or to which target floor the elevator car is displaced, may allow deriving information about which one of the call devices comprised in the elevator arrangement has been activated in order to result in the determined elevator usage information and elevator travel information.

Particularly, according to an embodiment, the method may beneficially be implemented such that, upon inferring the health status of one of the call devices, no information directly indicating an activation of the monitored call device is taken into consideration.

In other words, with embodiments of the method proposed herein, it may not be necessary to exactly know whether or not the monitored call device is actually activated at a certain point in time. Accordingly, it may not be necessary to have direct access to the monitored call device and/or to signals issued by the monitored call device upon activation thereof. Particularly, no direct electrical connection between a monitored call device and the monitoring device supervising its health status may be required.

Instead, it may be sufficient to have the elevator usage information and the elevator travel information and to indirectly infer an information about the current health status of the monitored call device from such information sources. Accordingly, the present method may also be applied in cases where no information directly indicating the activation of the monitored call device may be obtained, i.e. for example in cases where third-party elevator equipment has to be retrofitted with a capability for monitoring a health status of its call devices.

Particularly, according to an embodiment, the health status of the monitored call device may be inferred based on a probability value indicating with which probability the monitored call device has been activated within a predetermined time interval, the probability value being determined based on the elevator usage information and on the elevator travel information.

Expressed differently, the elevator usage information and the elevator travel information may be analyzed. While such analysis may in many cases not provide a certain indication that a specific one of a multiplicity of call devices has been activated, such analysis may at least provide an information indicating with which probability this call device has been activated.

For example, a combination of a specific elevator usage information and a specific elevator travel information may be the result of different actions occurring within the elevator arrangement. In such case, each of such actions may, with a certain probability, be the cause for the observed elevator usage information and the observed elevator travel information. One of such actions may be the activation of the monitored call device. Accordingly, based on the observed elevator usage information and elevator travel information, it may be inferred with which probability the monitored call device has actually been activated.

Such analysis may be continued during a predetermined time interval. Accordingly, a probability of an activation of the monitored call device during the predetermined time interval may be derived. A length of the predetermined time interval may be selected for example based on experimental data or based on a preceding learning procedure.

When for example a probability of an activation of the monitored call device during a long predetermined time interval is very low, i.e. the monitored call device has probably not been activated for a long time, this may indicate a malfunction of the monitored call device. Particularly, when the probability of an activation of the monitored call device during a predetermined time interval is substantially lower than during preceding time intervals of a same length, this may indicate a malfunction.

According to an embodiment, elevator usage information and elevator travel information may be gathered during several subsequent elevator trips and the health status of the monitored call device may be inferred based on the elevator usage information and on the elevator travel information gathered for the several subsequent elevator trips.

In other words, the health status of the monitored call device may be inferred not in a single analysis step but in several analysis steps. Therein, in each analysis step, elevator usage information and elevator travel information may be determined during an elevator trip, i.e. while the elevator car is displaced or shortly before or after such car displacement when the car is stopped at the starting floor or at the target floor. The health status may then be inferred with a high reliability based on the results of all these analysis steps.

Particularly, according to a specific embodiment, for each of the several subsequent elevator trips, a trip specific probability of an activation of the monitored call device may be derived based on the elevator usage information and the elevator travel information, and the health status of the monitored call device may then be inferred based on a combined probability of an activation of the monitored call device calculated from several of the trip specific probabilities.

This may mean that, in an analysis step analyzing the elevator usage information and the elevator travel information during one trip, it is determined with which trip-specific probability the monitored call device has been actuated. If such analysis is performed for multiple subsequent trips, a combined probability may be determined in an overall analysis. The calculation of the combined probability may include various mathematical steps such as addition and/or multiplication of trip-specific probabilities, possibly taking into account predetermined or trip-specific weighting factors. Such combined probability indicates a probability that the monitored call device has been actuated during a time period including the multiple trips. Accordingly, the combined probability informs with a high reliability about whether or not the monitored call device has been actuated.

According to an embodiment, when a health status lower than a predetermined limit value is determined for longer than a predetermined time period, a health information signal is generated and submitted to an elevator supervision device.

In other words, the health status may not only be monitored but consequences may be taken in case the inferred health status does not satisfy predetermined requirements. Therein, assuming that the health status may be expressed by a value, if such value is lower than a predetermined limit value for a long time, this may indicate that the monitored call device may suffer from a malfunction. In reaction to such recognition, the health information signal may be issued, such health information signal providing an information about the current health status of the monitored call device. Upon receiving such health information signal, the elevator supervising device may initiate suitable measures. For example, the elevator supervising device may inform maintenance staff such that the maintenance staff may visit the elevator arrangement and may check correct function of its call devices. Accordingly, proactive maintenance is possible before for example passengers are affected by a malfunction of a call device.

Embodiments of the method proposed herein may be performed or controlled by a monitoring device in accordance with the second aspect of the invention. Such monitoring device may have a processor and, optionally, memory for storing data and/or signals. Accordingly, the monitoring device may be programmable. Such monitoring device may process data from sensors or detectors included in the door contact, the light curtain device and/or the load measuring device. Based on such processed data, the monitoring device may detect one of the elevator events for determining the elevator usage information. In order to better process such elevator usage information, the monitoring device may further comprise or be connected to a positioning device for detecting a current position of the elevator car.

Furthermore, the monitoring device may receive information for example from the elevator controller or from further sensors comprised in the elevator arrangement allowing to determine the elevator travel information regarding the starting floor and/or the target floor of the elevator car motion just before or after an elevator event has been detect. The monitoring device may be a separate and/or independent device. Alternatively, the monitoring device may be part of another device. For example, the monitoring device may be included into the elevator controller. Alternatively, the monitoring device may be part of a remote control center supervising correct operation of the elevator arrangement.

Embodiments of the method proposed herein may be performed or controlled by executing a computer program product in accordance with the third aspect of the invention for example on the processor of a monitoring device. Particularly, the method may be implemented in software or a combination of software and hardware. The computer program product may be in any computer readable language. The computer program product may be stored on any computer readable medium such as a CD, a DVD, a flash storage, ROM, PROM, EPROM, etc. Alternatively, the computer program product may be stored on a computer or a server or a data cloud, from which it may be downloaded via a network such as the Internet.

It shall be noted that possible features and advantages of embodiments of the invention are described herein partly with respect to a method for inferring a health status of call devices and partly with respect to a monitoring device implementing such method. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawing. However, neither the drawing nor the description shall be interpreted as limiting the invention.

DESCRIPTION OF THE DRAWINGS

FIG. 1 shows an elevator arrangement comprising a monitoring device in accordance with the present invention.

The FIGURE is only schematic and not to scale. Same reference signs refer to same or similar features.

DETAILED DESCRIPTION

FIG. 1 shows an elevator arrangement 1 comprising a monitoring device 3 in accordance with an embodiment of the present invention. In the elevator arrangement 1, an elevator car 5 and a counterweight 7 are suspended by suspension means 9 comprising for example multiple ropes or cords. The suspension means 9 may be driven by a traction sheave 13 of the drive engine 11. Operation of the drive engine 11 is controlled by an elevator controller 15.

The elevator arrangement 1 comprises several call devices 20. For example, in the elevator car 5, car call devices 19 are included in a car operation panel 17. The car call devices 19 may be implemented using push buttons. For example, one push button may be provided for each of multiple floors of a building. On each of the floors including a starting floor 35 and a target floor 37, hall call devices 23 are provided for example in landing operation panels 21. Again, the hall call devices 23 may be implemented using push buttons. Optionally, two push buttons may be included in each hall call device 23 in order to enable indicating a direction to which the elevator car 5 shall travel after having stopped at the starting floor 35.

A passenger waiting for example at the starting floor 35 may press one of the push buttons of the hall call device 23 for indicating that the elevator car 5 shall come to this starting floor 35. When the elevator car 5 arrives at this starting floor 35, elevator doors 26 comprising a floor door 25 and a car door 27 may be opened. Generally, such opening of elevator doors 26 is detected using one or more door contacts 29. Upon opening the elevator door 26, the door contact 29 changes its switching state. Typically, the normally-closed door contact 29 opens when the elevator door 26 opens. The passenger may then enter the elevator car 5. Upon passing through an opening formed by the opened elevator doors 26, the passenger will pass through a light curtain generated by a light curtain device 31. Furthermore, upon entering the elevator car 5, a load measuring device 33 will detect a change in a load of the car 5.

The passenger may then select a target floor 37 by pushing one of the push buttons forming the car call devices 19. An information about the passenger's selection is submitted to the elevator controller 15 which then controls the drive engine 11 to displace the elevator car 5 towards the target floor 37. At the target floor 37, the elevator doors 26 open again and the passenger may leave the elevator car 5 again passing through the light curtain generated by the light curtain device 31 and at the same time lowering the weight of the elevator car 5 as detectable by the load measuring device 33. There is further a positioning device 34 for detecting a current position of the elevator car 5. This positioning device 34 could belong to or just connected to the monitoring device 3.

In order to monitor the call devices 20 and infer information about a health status of these call devices 20, elevator usage information and elevator travel information may be determined and may then be used for inferring the health status of a monitoring one of the call devices 20.

Particularly, for determining the elevator usage information, opening of the elevator door 26 may be detected using for example the door contact 29. Additionally or alternatively, interrupting of the light curtain at the entry to the elevator car 5 may be detected using the light curtain device 31. Furthermore, additionally or alternatively, changing of the weight of the elevator car 5 may be detected using the load measuring device 33.

Additional to detecting one of these elevator events for determining the elevator usage information, the elevator travel information may be determined for example by using information provided by further sensors or information provided by the elevator controller 15. Therein, the elevator travel information relates to an identity of the starting floor 35 or of the target floor 37 between which the elevator car 5 is displaced before or after the above-mentioned elevator event takes place.

By suitably processing and analyzing the determined elevator usage information and elevator travel information, the monitoring device 3 may derive information about a current health status of the call devices 20 in the elevator arrangement 1 without necessarily having direct access to these call devices 20 and/or without necessarily having to include any additional sensors into such call devices 20. Instead, the information about the health status of the call devices 20 may be derived solely based on measurement results provided by sensors or devices, such as the door contacts 29, the light curtain device 31 and/or the load measuring device 33, which are generally included in elevator arrangements 1 for safety reasons and which generally are easily accessible.

In the following, two exemplary implementations of the method proposed herein will be described.

In a first example, the method starts with the elevator car 5 initially standing at a known starting floor 35. The method then relies on tracking a sequence of elevator events including a status of door contacts 29, a status of load weighing and a status of the light curtain, in order to infer what type of elevator call has been and at which location.

Generally, when the elevator car 5 is stationary, its position is known. Any travel without an initial opening of the elevator doors 26 will typically register an existence of a floor call from a passenger.

Arriving at the target floor 37 allows the proposed method to log a successful call entry for the floor in question. A transition in the load weighing value sensed by the load measuring device 33 combined with an activation of the light curtain typically registers an entry of the passenger into the elevator car 5.

A subsequent trip in combination with an activation of the light curtain and a decrease in the weight of the elevator car 5 allows the method to infer that a car call was entered at the next destination.

Any change to the weight of the elevator car 5 allows the method to infer the boarding or disembarking of one or more passengers and a subsequent registration of other hall or car calls.

Another important characteristic of a behavior of an elevator may be related to a time the elevator doors 26 remain open when serving any calls. Typically, car calls elicit shorter door open times versus hall call due to an anticipated speed with which a passenger will leave the elevator car 5 once the elevator doors 26 are opened. A boarding passenger will possibly need to move towards the arriving elevator car 5 and be more likely to need additional time to board. Lastly, a confluence of car and hall calls may result in an even longer door open time and this information may also be used to infer the type of call being served.

Over the course of e.g. one typical day, all floors in a building are expected to be visited. This may allow the inference of the health status of all call devices 20.

If, for example, no single actuation of one of the call devices 20 in the building is detected during an entire day, this may be taken as indicating a problem in the health status of this call device 20, i.e. for example a malfunction. Upon detecting such reduced health status, a health information signal may be generated and may be submitted for example towards a remote elevator supervision device 41. At such remote elevator supervision device 41, the health information signal may be processed and, if deemed necessary, for example maintenance staff may be sent to visit the elevator arrangement 1.

In a second specific exemplary implementation, it may be assumed that the elevator car 5 is initially waiting at the starting floor 35 being for example the ground floor of a building. While waiting, the elevator doors 26 are closed and a load in the elevator car 5 is assumed to be zero.

Upon determining the elevator usage information, it may then for example be detected that no opening of the elevator doors 26 occurred and no change of the weight of the elevator car 5 was registered. From this information alone, it may already be inferred that probably the actuation of a hall call device 23 initiated the present elevator car trip. Furthermore, upon obtaining the elevator travel information indicating that the elevator car 5 travels to a target floor 37 such as the third floor of the building, it may be inferred that probably the actuation of a hall call device 23 in the third floor initiated the present elevator car trip. A probability value 39 indicating that this assumption is correct may be assumed to be for example 33%.

Next, it may be detected for example that the elevator doors 26 open for five seconds. Then, a light curtain is triggered and a load in the elevator car 5 increases by 30%. Based on this elevator usage information, it may be inferred that the probability 39 that an actuation of the hall call device 23 at the third floor initiated the elevator car trip may be assumed to be for example 66%.

In a next step, it may be detected that the opening status of the elevator doors 26 changes again and the elevator doors 26 close. Subsequently, the elevator car 5 travels to a next target floor 37 such as the fifth floor. From associated elevator usage information and elevator travel information, it may be inferred that a probability 39 that a car call device 19 indicating the fifth floor has been pressed may be assumed to be for example 50%. Furthermore, it may be assumed that an "up" button of a hall call device 23 on the third floor was pressed with a probability 39 of for example 83%. Lastly, it may alternatively be assumed that a button of a hall call device 23 on the fifth floor was pressed with a probability of 33%.

In a final step, it is observed that the elevator doors 26 open again for 3 seconds, a car load is decreased to 0% and the light curtain is triggered. From this elevator usage information and elevator travel information, it may be finally inferred that the car call device 23 on the fifth floor was actuated with a probability of 100%, the "up" button of the hall call device 23 on the third floor was actuated with a probability of 100% and the hall call device 23 on the fifth floor was actuated with a probability of 0%, i.e. was not actuated.

Accordingly, a health status of hall call devices 23 and/or of car call devices 19 may be inferred as a degree of probability 39 for each trip initiated.

Trips initiated without an opening of elevator doors 26 may be classified as probably being initiated by hall calls.

Door open times may be used to support a call type inference. For example, a door open time of five seconds may represent hall calls or may at least be more probable for hall calls whereas a door open time of three seconds may represent car calls. These times may be learned for example in a preceding learning procedure.

Subsequent trips initiated following an increase in elevator car load may be inferred to be car calls and would increase a probability of the initial trip being triggered by a hall call.

A direction of travel of a subsequent trip may be used to infer the direction of a hall call.

Trips with no door opening either at a start or an end of the trip are typically parking calls and may be ignored.

Embodiments of the proposed method and the monitoring device implementing such method may allow inferring the health status of call devices 20 in an elevator arrangement 1 with a reduced number of sensors.

Finally, it should be noted that the term "comprising" does not exclude other elements or steps and the "a" or "an" does not exclude a plurality. Also elements described in association with different embodiments may be combined.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for inferring a health status of call devices in an elevator arrangement, the method comprising the steps of:

determining elevator usage information of the elevator arrangement by detecting at least one elevator event, the detected at least one elevator event being one of changing an opening status of an elevator door, interrupting a light curtain at an entry to an elevator car, and changing a weight of the elevator car;

determining elevator travel information associated with at least one of a starting floor and a target floor for motion of the elevator car taking place one of antecedent to the detected at least one elevator event and subsequent to the detected at least one elevator event; and inferring a health status of a monitored one of the call devices based on the elevator usage information and the elevator travel information.

2. The method according to claim 1 including performing the step of inferring the health status of the monitored call device when no information directly indicating the activation of the monitored call device may be obtained or when no information directly indicating an activation of the monitored call device is taken into consideration.

3. The method according to claim 1 including inferring the health status of the monitored call device based on a probability value indicating a probability that the monitored call device has been activated within a predetermined time interval, the probability value being determined based on the elevator usage information and the elevator travel information.

4. The method according to claim 1 including gathering the elevator usage information and the elevator travel information during several subsequent trips of the elevator car and inferring the health status of the monitored call device based on the elevator usage information and the elevator travel information gathered for the several subsequent trips.

5. The method according to claim 4 including, for each of the several subsequent trips, deriving a trip specific probability of an activation of the monitored call device based on the elevator usage information and the elevator travel information, and inferring the health status of the monitored call device based on a combined probability of an activation of the monitored call device calculated from several of the trip specific probabilities.

6. The method according to claim 1 including when the health status lower than a predetermined limit value is determined for longer than a predetermined time period, generating a health information signal and submitting the health information signal to an elevator supervision device.

7. The method according to claim 1 including determining the elevator usage information by detecting a current position of the elevator car.

8. A monitoring device for inferring a health status of call devices in an elevator arrangement, the monitoring device being incorporated in the elevator arrangement and being adapted to at least one of perform and control the method steps according to claim 1.

9. The monitoring device according to claim 8 wherein the monitoring device is connected to at least one of a door contact for detecting the change in an opening status of an elevator door, a light curtain device for detecting the interrupting of a light curtain at an entry to an elevator car, and a load measuring device for detecting the changing of a weight of the elevator car.

10. The monitoring device according to claim 9 wherein the monitoring device includes or is connected to a positioning device for detecting a current position of the elevator car.

11. A computer program product comprising computer readable instructions which, when stored on a non-transitory computer-readable medium and performed by a processor of a monitoring device, instruct the monitoring device to one of perform and control the method steps according to claim 1.

12. A non-transitory computer readable medium comprising the computer program product according to claim 11 stored thereon.

13. A method for inferring a health status of call devices in an elevator arrangement, the method comprising the steps of:

determining elevator usage information of the elevator arrangement by detecting an elevator event, the detected elevator event being one of changing an opening status of an elevator door, interrupting a light curtain at an entry to an elevator car, and changing a weight of the elevator car;

determining elevator travel information associated with at least one of a starting floor and a target floor for motion of the elevator car taking place one of antecedent to the detected elevator event and subsequent to the detected elevator event;

gathering the elevator usage information and the elevator travel information during several subsequent trips of the elevator car; and inferring a health status of a monitored one of the call devices based on a probability value indicating a probability that the monitored call device has been activated within a predetermined time interval, the probability value being determined based on the elevator usage information and the elevator travel information gathered for the several subsequent trips.

14. The method according to claim 13 including performing the step of inferring the health status of the monitored call device when no information directly indicating the activation of the monitored call device may be obtained or when no information directly indicating an activation of the monitored call device is taken into consideration.

15. The method according to claim 13 including when the health status lower than a predetermined limit value is determined for longer than a predetermined time period, generating a health information signal and submitting the health information signal to an elevator supervision device.

16. The method according to claim 13 including determining the elevator usage information by detecting a current position of the elevator car.

* * * * *